US009695060B2

(12) United States Patent
Levy et al.

(10) Patent No.: US 9,695,060 B2
(45) Date of Patent: Jul. 4, 2017

(54) METHOD FOR THE PRODUCTION OF AN LMO PRODUCT

(75) Inventors: Caroline Levy, Paris (FR); Samuel Marlin, Plan D'orgon (FR); Yves Boussant-Roux, Montfavet (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 708 days.

(21) Appl. No.: 13/997,438

(22) PCT Filed: Dec. 22, 2011

(86) PCT No.: PCT/IB2011/055889
§ 371 (c)(1),
(2), (4) Date: Aug. 1, 2013

(87) PCT Pub. No.: WO2012/085874
PCT Pub. Date: Jun. 28, 2012

(65) Prior Publication Data
US 2013/0323597 A1 Dec. 5, 2013

(30) Foreign Application Priority Data
Dec. 23, 2010 (FR) ..................................... 10 61137

(51) Int. Cl.
| C01D 15/00 | (2006.01) |
| C01D 15/02 | (2006.01) |
| C01G 45/12 | (2006.01) |
| C01G 49/00 | (2006.01) |
| C01G 51/00 | (2006.01) |
| C01G 53/00 | (2006.01) |
| H01M 4/505 | (2010.01) |
| H01M 4/525 | (2010.01) |

(52) U.S. Cl.
CPC ......... *C01D 15/02* (2013.01); *C01G 45/1242* (2013.01); *C01G 49/009* (2013.01); *C01G 51/54* (2013.01); *C01G 53/54* (2013.01); *H01M 4/505* (2013.01); *H01M 4/525* (2013.01); *C01P 2002/32* (2013.01); *C01P 2002/52* (2013.01); *C01P 2002/54* (2013.01); *C01P 2002/72* (2013.01); *C01P 2004/61* (2013.01); *C01P 2004/62* (2013.01); *C01P 2006/40* (2013.01); *Y02P 70/54* (2015.11)

(58) Field of Classification Search
USPC ................ 429/221, 224, 223, 220; 423/599; 252/519.1; 264/620; 117/944
See application file for complete search history.

(56) References Cited

U.S. PATENT DOCUMENTS

| 3,993,119 A | 11/1976 | Scott | |
| 2002/0044906 A1* | 4/2002 | Tabata | C01G 45/1242 423/464 |
| 2012/0282526 A1* | 11/2012 | Yasuda et al. | 429/224 |

FOREIGN PATENT DOCUMENTS

| CN | 101 335 346 A | | 12/2008 |
| JP | 2008-105912 | * | 5/2008 |
| WO | 2011/078389 | * | 6/2011 |

OTHER PUBLICATIONS

Translation of Example 3 of JP 2008-105912, May 8, 2008.*
Kopec et al., "X-ray diffraction and impedence spectroscopy studies of lithium manganese oxide spinel" J. of Power Sources 159 (2006) pp. 412-419.*
Kachibaya et al., "Cathodic Materials for Lithium-Ion Batteries Based on Spinels $Li_\chi Mn_{2-\gamma}Me_\gamma O_4$: Synthesis, Phase Composition, and Structure of $Li_\chi Mn_{2-\gamma}Cr_\gamma O_4$ at $\chi=1.0$-$1.2$ and $\gamma=0$-$0.5$," *Russian Journal of Electrochemistry*, vol. 42, No. 11, pp. 1224-1234, Nov. 1, 2006.
Fey et al., "Preparation and electrochemical properties of high-voltage cathode materials, $LiM_\gamma Ni_{0.5-\gamma}Mn_{1.5}O_4$ (M=Fe, Cu, Al, Mg; $\gamma=0.0$-$0.4$)," *Journal of Power Sources*, vol. 115, No. 2, pp. 332-345, Apr. 10, 2003.
Hwang et al., "Synthesis and characterization of multidoped lithium manganese oxide spinel, $Li_{1.02}Co_{0.1}Ni_{0.1}Mn_{1.8}O_4$ for rechargeable lithium batteries," *Journal of Power Sources*, vol. 108, No. 1-2, pp. 250-255, Jun. 1, 2002.
Written Opinion of the International Searching Authority Issued in Application No. PCT/IB2011/055889; Dated Feb. 29, 2012 (With Translation).
International Search Report issued in Application No. PCT/IB2011/055889; Dated Feb. 29, 2012 (With Translation).

* cited by examiner

*Primary Examiner* — Steven Bos
(74) *Attorney, Agent, or Firm* — Oliff PLC

(57) ABSTRACT

A fused product including lithium-manganese spinel, which is optionally doped, having a spinel structure $AB_2O_4$, where the site A is occupied by lithium and the site B is occupied by manganese, it being possible for the site B to be doped with an element B' and it being possible for the site A to exert a substoichiometry or a superstoichiometry with respect to the site B, so that the product observes the formula $Li_{(1+x)}Mn_{(2-y)}B'_yO_4$, with $-0.20 \le x \le 0.4$ and $0 \le y \le 1$, the element B' being chosen from aluminum, cobalt, nickel, chromium, iron, magnesium, titanium, vanadium, copper, zinc, gallium, calcium, niobium, yttrium, barium, silicon, boron, zirconium and their mixtures.

42 Claims, No Drawings

METHOD FOR THE PRODUCTION OF AN LMO PRODUCT

TECHNICAL FIELD

The invention relates to a novel product comprising lithium-manganese spinel, referred to as "LMO product", and to a new process for the manufacture of such a product.

STATE OF THE ART

The term "lithium-manganese spinel", or "LMO" conventionally refers to a material having a spinel structure $AB_2O_4$, where the site A is occupied by lithium and the site B is occupied by manganese, it being possible for the site B to be doped with an element B' and it being possible for the site A to exhibit a substoichiometry or a superstoichiometry with respect to the site B, so that the product observes the formula $Li_{(1+x)}Mn_{(2-y)}B'_yO_4$, with $-0.20 \leq x \leq 0.4$ and $0 \leq y \leq 1$, the element B' being chosen from aluminum, cobalt, nickel, chromium, iron, magnesium, titanium, vanadium, copper, zinc, gallium, calcium, niobium, yttrium, barium, silicon, boron, zirconium and their mixtures. The electrical space neutrality of said product having a spinel structure of formula $Li_{(1+x)}Mn_{(2-y)}B'_yO_4$ is ensured by the oxygen content. $LiMn_2O_4$ is a specific example of LMO.

The LMO is used in particular for the manufacture of cathodes of lithium-ion batteries. It is generally manufactured by the following processes:
- coprecipitation/sol-gel,
- synthesis by sintering in the solid route, or
- synthesis from precursors and pyrolysis.

These processes, which are complex, result in a high cost.

There thus exists a need for a novel process which makes it possible to manufacture LMO at a reduced cost and in industrial amounts. The aim of the invention is to meet this need.

SUMMARY OF THE INVENTION

According to the invention, this aim is achieved by means of a product comprising, indeed even composed of, LMO, referred to as "LMO product", which is noteworthy in that it is fused, that is to say that is obtained by melting, followed by solidification.

Although the manufacture of products by fusion-solidification is well known, it is to the credit of the inventors to have discovered that, contrary to a preconception, this technique makes it possible to manufacture LMO.

Advantageously, the product according to the invention can thus be manufactured at reduced cost and in industrial amounts.

The product according to the invention is preferably an annealed product, that is to say a product which has been subjected to a heat treatment after it has solidified.

The content and the nature of the LMO obtained depend in particular on the composition of the starting charge. A product according to the invention is, however, always polycrystalline.

In one embodiment of the invention, the fused product comprises an LMO content of greater than 50%, impurities excluded, said LMO exhibiting molar contents li, b' and m of lithium, of doping element and of manganese, respectively, such that, assuming $x=(2 \cdot li/(m+b'))-1$ and $y=2 \cdot b'/(m+b')$, $x \geq -0.20$, preferably $x \geq -0.15$, preferably $x \geq -0.1$, preferably $x \geq 0$ and $x \geq 0.4$, preferably $x \leq 0.33$, preferably $x \leq 0.2$, indeed even $x \leq 0.1$, and $0 \leq y \leq 1$, preferably $y \leq 0.8$, preferably $y \leq 0.6$, preferably $y \leq 0.4$, preferably $y \leq 0.3$.

The variables x and y correspond to the atomic proportions x and y of the structure $Li_{(1+x)}Mn_{(2-y)}B'_yO_4$ of the lithium-manganese spinel, optionally doped, of the product according to the invention.

The definition of the LMO content of a product is given subsequently in this description.

Preferably, a product according to the invention also comprises one and preferably several of the following optional characteristics:
- the LMO content, impurities excluded, is greater than 60%, preferably greater than 70%, preferably greater than 90%, preferably greater than 99%, more preferably greater than 99.9%, indeed even 100%;
- the remainder to 100% of the LMO and impurities is preferably composed, for more than 60%, more than 80%, more than 90%, more than 95%, more than 98%, more than 99%, indeed even to 100%, by weight, of the constituents of the LMO in other forms;
- the element B' is a dopant for the manganese chosen from the group consisting of aluminum, cobalt, nickel, chromium, iron, magnesium, titanium, vanadium, copper, zinc, gallium and their mixtures. This is because these dopants significantly improve the number of charge/discharge cycles which an electrode manufactured from a product according to the invention can undergo and/or the electric capacity of said electrode;
- the element B' used is chosen from the group formed by aluminum, cobalt, nickel, chromium, iron and their mixtures;
- preferably, the total content by weight of impurities, expressed in the form of oxides, is less than 1%, preferably less than 0.7%, preferably less than 0.4%, preferably less than 0.1%;
- in the preferred embodiment, the impurities are all the elements other than lithium, the element B', manganese and the combinations of these elements. In particular, it is possible to encounter, as impurities, the elements Na, K, indeed even Al, Co, Ni, Cr, Fe, Mg, Ti, V, Cu, Zn, Ga, Ca, Nb, Y, Ba, Si, B or Zr when the element B' does not comprise, respectively, aluminum, cobalt, nickel, chromium, iron, magnesium, titanium, vanadium, copper, zinc, gallium, calcium, niobium, yttrium, barium, silicon, boron or zirconium;
- preferably,
  $Na_2O<0.1\%$, preferably $Na_2O<0.07\%$, preferably $Na_2O<0.05\%$, and/or
  $K_2O<0.1\%$, preferably $K_2O<0.07\%$, preferably $K_2O<0.05\%$.

Advantageously, these optional characteristics improve the electrical conductivity properties, rendering the products particularly suitable, after optional grinding, for the manufacture of cathodes for lithium-ion batteries.

In a specific embodiment, the lithium-manganese spinel is not doped and exhibits the formula $Li_{(1+x)}Mn_2O_4$. Preferably, the ratio $(1+x)/2$ is greater than 0.45, preferably greater than 0.48, preferably greater than 0.50, preferably greater than 0.51 and/or preferably less than 0.57, preferably less than 0.56, preferably less than 0.54. Advantageously, the amount of energy stored in the battery is increased thereby.

A product according to the invention can in particular be provided in the form of a particle. The particle size can in particular be greater than 0.01 μm, indeed even greater than 0.1 μm, indeed even greater than 0.5 μm, indeed even greater than 1 μm, indeed even greater than 10 μm or than 0.25 mm and/or less than 5 mm, indeed even less than 4 mm, indeed even less than 3 mm.

A particle according to the invention can in particular comprise more than 50%, more than 60%, more than 70%, more than 80%, more than 90%, indeed even substantially 100%, by weight, of fused product.

The invention also relates to a powder comprising more than 90% by weight, indeed even more than 95%, indeed even substantially 100%, of particles according to the invention.

The median size of the powder is preferably greater than 0.4 μm and/or less than 4 mm.

In a first specific embodiment, the median size of the powder is between 0.5 μm and 5 μm, preferably between 2 μm and 4 μm. In a second specific embodiment, the median size of the powder is between 5 μm and 15 μm, preferably between 7 μm and 12 μm. In a third specific embodiment, the median size of the powder is between 15 μm and 35 μm, preferably between 20 μm and 30 μm.

A product according to the invention can also be provided in the form of a block, all the dimensions of which are preferably greater than 1 mm, preferably greater than 2 mm, preferably greater than 5 cm, more preferably greater than 15 cm. Preferably, a block exhibits a weight of greater than 200 g.

The invention also relates to a manufacturing process comprising the following stages:
a) mixing starting materials, so as to form a starting charge suitable for obtaining, on conclusion of stage c), a product comprising LMO,
b) melting the starting charge until a liquid mass is obtained,
c) cooling said liquid mass until it has completely solidified, so as to obtain a fused product,
d) optional grinding of said fused product,
e) preferably, heat treating the fused product at a stationary temperature level of between 500° C. and 1540° C. and for a maintenance time at the stationary level of greater than 30 minutes.

By simple adjustment of the composition of the starting charge, melting-solidification processes, followed by heat treatment, thus make it possible to manufacture LMO products having different sizes and exhibiting an LMO content, impurities excluded, of greater than 50%, preferably of greater than 70%, preferably of greater than 90%, more preferably of greater than 99%, still preferably of greater than 99.9%, indeed even substantially 100%.

Preferably, a manufacturing process according to the invention also comprises one and preferably several of the following optional characteristics:
in stage b), the temperature at which the starting charge is melted is preferably greater than 1450° C., preferably greater than 1480° C., and/or preferably less than 1800° C., preferably less than 1700° C., and preferably less than 1600° C., preferably less than 1550° C.,
the process is adjusted in order to result in a product according to the invention;
at least one, indeed all, of the elements lithium, B' and manganese are introduced in the oxide form;
the compounds contributing the elements lithium, B' and manganese together represent more than 90%, preferably more than 99%, as percentages by weight, of the constituents of the starting charge. Preferably, these compounds represent, together with the impurities, 100% of the constituents of the starting charge;
the compounds contributing the elements lithium, B' and manganese are chosen from $Li_2CO_3$, $Li_2O$, $MnO_2$, $MnO$, $Mn_3O_4$, the carbonates of the element B', the hydroxides of the element B' and the oxides of the element B';
in a specific embodiment, oxide powders are used to contribute the elements B' and manganese and a carbonate powder is used to contribute the element lithium;
in stage b), neither a plasma torch nor a heat gun is used. In particular, an arc furnace or induction furnace is used. Advantageously, the productivity is improved thereby. In addition, the processes employing a plasma torch or a heat gun generally do not make it possible to manufacture fused particles, if melting takes place in the plasma torch or in the heat gun, with a size of greater than 200 microns and at the very least of greater than 500 microns.
in stage b), melting is carried out in a crucible in a heat treatment furnace, preferably in an electric furnace, preferably in an oxygen-comprising environment, for example under air.

The fused product according to the invention can be provided, at the end of stage c), in the form of particles having a size of less than 100 μm. The grinding of said particles is then unnecessary.

In a first embodiment, stage c) comprises the following stages:
$c_1$) dispersing the liquid mass in the form of liquid droplets,
$c_2$) solidifying these liquid droplets by contact with an oxygen-comprising fluid, such as to obtain fused particles.

By simple adjustment of the composition of the starting charge, conventional dispersing processes, in particular by blowing or spray drying, thus make it possible to manufacture, starting from a molten liquid mass, particles exhibiting an LMO content, impurities excluded, of greater than 50%, preferably of greater than 60%, preferably of greater than 70%, more preferably of greater than 90%, more preferably of greater than 99%, still preferably of greater than 99.9%, indeed even of substantially 100%.

In the first embodiment, preferably, the manufacturing process also comprises one and preferably several of the optional characteristics listed above and/or of the following specific characteristics:
In stage $c_1$) and/or in stage $c_2$), said liquid mass is brought into contact with an oxygen-comprising fluid which is preferably identical.
The oxygen-comprising fluid is preferably a gas.
The oxygen-comprising fluid preferably exhibits an oxygen content of greater than 20% by volume.
The stages of dispersion and of solidification are simultaneous.
Contact is maintained between the droplets and an oxygen-comprising fluid until said droplets have completely solidified.

In a second embodiment, stage c) comprises the following stages:
$c_1$') pouring the liquid mass into a mold;
$c_2$') solidifying, by cooling, the liquid mass poured into the mold until an at least partially solidified block is obtained;
$c_3$') removing the block from the mold.

In the second embodiment, preferably, the manufacturing process according to the invention also comprises one and preferably several of the optional characteristics listed above and/or of the following specific characteristics:

In stage $c_1'$) and/or in stage $c_2'$) and/or after stage $c_3'$), said liquid mass in the course of solidifying is brought into contact, directly or indirectly, with an oxygen-comprising fluid, preferably comprising at least 20% of oxygen, preferably a gas.

Said contact is begun immediately after removing the block from the mold.

Said contact is maintained until the block has completely solidified.

The fused product according to the invention can be provided, at the end of stage c), in the form of a block or of particles having a size of greater than 100 μm. The fused product is then preferably ground, so as to obtain a powder exhibiting a maximum size $D_{99.5}$ of less than 110 μm, preferably of less than 100 μm, preferably of less than 80 μm, preferably of less than 53 μm, preferably of less than 30 μm, preferably of less than 10 μm.

In the optional stage d), the fused product is ground.

In stage e), preferably, the fused particles are annealed at a stationary temperature level of between 500° C. and 1540° C. and for a maintenance time at the stationary level of greater than 30 minutes. Preferably, the stationary temperature level is greater than 550° C., preferably greater than 600° C., preferably greater than 650° C., preferably greater than 700° C. and/or preferably less than 1200° C., preferably less than 1100° C., preferably less than 1000° C., preferably less than 900° C. A stationary temperature level of 800° C. is highly suitable.

Preferably, the maintenance time at the stationary level is greater than 2 hours and/or less than 24 hours, preferably less than 15 hours, preferably less than 10 hours. A stationary temperature level of 800° C., maintained for 4 hours, is highly suitable.

More preferably, the fused particles are annealed under an atmosphere comprising at least 20% by volume of oxygen, preferably under air, preferably at ambient pressure of approximately 1 bar.

The annealed fused particles can be ground and/or subjected to a particle size selection operation according to the applications targeted, for example by sieving, in particular so that the particles obtained exhibit a size of greater than 1 μm, indeed even of greater than 10 μm and/or of less than 5 mm.

The annealed fused particles can also be subjected to an additional stage of granulation or spray drying, in order to form aggregates or agglomerates.

Whatever the embodiment considered, other phases than the LMO can be present, and also impurities originating from the starting materials.

The invention also relates to a product capable of being obtained by a process according to the invention.

The invention also relates to the use of fused products according to the invention or products which are manufactured or are capable of being manufactured by a process according to the invention in the manufacture of cathodes for a lithium-ion battery.

Finally, the invention relates to a cathode for a lithium-ion battery and to a battery comprising such a cathode comprising a fused product according to the invention or a product which is manufactured or capable of being manufactured by a process according to the invention. The cathode can in particular be obtained by shaping a powder according to the invention.

DEFINITIONS

For an LMO under consideration, there generally exists an ICDD ("International Center for Diffraction Data") sheet which makes it possible to identify the angular ranges of the diffraction peaks corresponding to said LMO. For example, the ICDD sheet 00-054-0258 is that of the lithium-manganese $LiMn_2O_4$ spinel phase. The main angular range is that which, among these angular ranges, corresponds to the peak or multiplet of highest intensity. If the ICDD sheet of an LMO does not exist, the ICDD sheet of lithium-manganese $LiMn_2O_4$ will be regarded as the ICDD sheet of said LMO.

When it is desired to evaluate the content of an LMO from an X-ray diffraction diagram, "main peak" or "main multiplet", refers conventionally to the peak or multiplet which extends into the main angular range of said LMO or in the immediate vicinity of said main angular range.

The LMO content, impurities excluded, in %, in a product, is defined according to the following formula (1):

$$T=100*(A_{LMO})/(A_{LMO}+A_{Secondary\ phases}) \quad (1)$$

where $A_{LMO}$ is the sum of the areas of the LMO phases, measured on an X-ray diffraction diagram of said product, for example obtained from a device of the D5000 diffractometer type from Bruker provided with a copper X-ray diffraction tube, without deconvolution treatment. The area of an LMO phase is that of its main diffraction peak or of its main diffraction multiplet;

$A_{secondary\ phases}$ is the sum of the areas of the secondary phases, measured on the same diagram, without deconvolution treatment. The area of a secondary phase is that of its nonsuperimposed diffraction peak of greatest intensity or of its nonsuperimposed diffraction multiplet of greatest intensity. The secondary phases are the phases detectable by X-ray diffraction, other than the LMO phases. Inter aria, $Li_{0.4}Mn_{0.6}O$, or $LiMnO_2$, or $Mn_3O_4$, or $MnO$, or $Mn_2O_3$ can be secondary phases identified on the X-ray diffraction diagram, in particular when the LMO is not doped, that is to say when it does not comprise an element B'. A "nonsuperimposed" diffraction peak is a diffraction peak corresponding to a single phase (no superimposition of two peaks corresponding to two different phases). Likewise, a "nonsuperimposed" diffraction multiplet is a diffraction multiplet corresponding to a single phase.

The term "particle" is understood to mean a solid object, the size of which is less than 10 mm, preferably between 0.01 μm and 5 mm. "Size" of a particle refers to the mean of its greatest dimension dM and of its smallest dimension dm: (dM+dm)/2. The size of a particle is evaluated conventionally by a particle size distribution characterization carried out with a laser particle sizer. The laser particle sizer can, for example, be a Partica LA-950 from Horiba.

The "sphericity" of the particle can be greater than 0.5, preferably than 0.6, this sphericity being defined as the ratio of its smallest dimension to its greatest dimension.

The term "block" is understood to mean a solid object which is not a particle.

The term "fused product" is understood to mean a product obtained by solidification by cooling of a molten material.

A "molten material" is a liquid mass which can comprise a few solid particles but in an amount insufficient for them to be able to structure said mass. In order to retain its shape, a molten material has to be present in a container.

The 10 ($D_{10}$), 50 ($D_{50}$) and 90 ($D_{90}$) centiles or "percentiles" are the particle sizes corresponding to the percentages, by weight, of 10%, 50% and 90% respectively on the cumulative particle size distribution curve of the particle sizes of the powder, the particle sizes being classified by increasing order. For example, 10% by weight of the particles of the powder have a size of less than $D_{10}$ and 90% of the particles by weight have a size of greater than $D_{10}$. The percentiles can be determined using a particle size distribution produced using a laser particle sizer.

The term "minimum size of a powder" refers to the 10 ($D_{10}$) percentile of said powder.

The term "median size of a powder" refers to the 50 ($D_{50}$) percentile of said powder.

The term "impurities" is understood to mean the inevitable constituents, unintentionally and necessarily introduced with the starting materials or resulting from the reactions with these constituents. The impurities are not necessary constituents but only tolerated constituents.

Unless otherwise indicated, all the contents as oxides of the products according to the invention are percentages by weight, expressed on the basis of the oxides.

The terms "comprising a" or "containing a" are understood to mean "comprising at least one", unless otherwise indicated.

DETAILED DESCRIPTION

An example of the process according to the invention is now described in detail.

In stage a), a starting charge which makes it possible to manufacture a fused product according to the invention is formed from compounds of lithium, or optionally of element B' and of manganese, in particular in the form of oxides or of carbonates or of hydroxides or of oxalates or of nitrates, or of precursors of the elements lithium, B' and manganese. The composition of the starting charge can be adjusted by addition of pure oxides or of mixtures of oxides and/or of precursors, in particular $Li_2O$, $Li_2CO_3$, oxide(s) of the element B', carbonate(s) of the element B', hydroxide(s) of the element B', $MnO_2$, $MnO$ or $Mn_3O_4$. The use of oxides and/or of carbonates and/or of hydroxides and/or of nitrates and/or of oxalates improves the availability of oxygen necessary for the formation of LMO and for its electrical neutrality, and is thus preferred.

The amount of lithium, of element B' and of manganese of the starting charge are for the most part encountered in the fused product manufactured. A portion of the constituents, for example the manganese and/or lithium, which can vary as a function of the melting conditions, can volatilize during the melting stage. From their general knowledge or from simple routine tests, a person skilled in the art knows how to adjust the amounts of these constituents in the starting charge as a function of the content which he desires to find in the fused products and of the melting conditions employed.

The particle sizes of the powders used can be those commonly encountered in melting processes.

Preferably, no compound other than those providing the elements lithium, B' and manganese, indeed even no compound other than $Li_2O$, $Li_2CO_3$, oxide(s) of the element B', carbonate(s) of the element B', hydroxide(s) of the element B', $MnO_2$, $MnO$ or $Mn_3O_4$ is deliberately introduced into the starting charge, the other elements present thus being impurities. In one embodiment, the sum of $Li_2O$, $Li_2CO_3$, oxide(s) of the element B', carbonate(s) of the element B', hydroxide(s) of the element B', $MnO_2$, $MnO$ or $Mn_3O_4$ and of their precursors represents more than 99% by weight of the starting charge.

In order to increase the content of optionally doped LMO in the fused product, it is preferable for the molar proportions of the elements lithium, B' and manganese in the starting charge to be close to those of the optionally doped LMO spinel which it is desired to manufacture.

Thus, it is preferable, in the starting charge, for the molar contents $C_{li}$, $C_{b'}$ and $C_m$ of the elements lithium, B' and manganese, respectively, as molar percentages on the basis of the sum of the contents $C_{li}$, $C_{b'}$ and $C_m$, to observe the following conditions:

$$k_1 \cdot (1+x)/(2-y) \leq C_{b'}/C_m \leq k_2 \cdot (1+x)/(2-y) \quad (2), \text{ and/or}$$

$$k_1 \cdot (1+x)/y \leq C_b/C_m \leq k_2 \cdot (1+x)/y \quad (3)$$

where
x and y can take the values defined above, in particular $-0.20 \leq x \leq 0.4$ and $0 \leq y \leq 1$, and
$k_1$ is equal to 0.8, preferably to 0.9, and
$k_2$ is equal to 1.2, preferably to 1.1.

Of course, these values of $k_1$ and $k_2$ are those to be adopted under established operating conditions, that is to say outside phases of transition from different compositions and outside initiation phases. This is because, if the desired product involves a change in composition of the starting charge with respect to that employed to manufacture the preceding product, it is necessary to take into account the residues of the preceding product in the furnace. However, a person skilled in the art knows how to consequently adjust the starting charge.

An intimate mixture of the starting materials can be prepared in a mixer. This mixture is subsequently tipped into a melting furnace.

In stage b), the starting charge is melted, preferably in an electric arc furnace. This is because electrical melting makes possible the manufacture of large amounts of fused product with advantageous yields.

It is possible, for example, to use an arc furnace of Héroult type comprising two electrodes, the vessel of which has a diameter of approximately 0.8 m and is able to comprise approximately 180 kg of molten liquid. Preferably, the energy is between 1300 and 1500 kWh/T. The voltage is, for example, approximately 115 volts and the power is of the order of 250 kW.

However, all known furnaces can be envisaged, such as an induction furnace, a plasma furnace or other types of Héroult furnace, provided that they make it possible to completely melt the starting charge. Electric furnace crucible melting can also be envisaged.

At the end of stage b), the starting charge is in the form of a liquid mass which can optionally comprise a few solid particles but in an amount insufficient for them to be able to structure said mass. By definition, in order to retain its shape, a liquid mass has to be present in a container.

In a first embodiment, stage c) consists of the stages $c_1$) and $c_2$) described above.

In stage $c_1$), a thin stream of the molten liquid, at a temperature preferably of greater than 1450° C., preferably of greater than 1480° C. and preferably of less than 1800° C., preferably of less than 1700° C., is dispersed into liquid droplets.

When the starting charge is adjusted so as to obtain a product based on nondoped LMO, a thin stream of the molten liquid, at a temperature preferably of greater than 1450° C., preferably of greater than 1480° C. and preferably of less than 1600° C., preferably of less than 1550° C., is dispersed into liquid droplets. When the starting charge is adjusted so as to obtain an LMO product comprising cobalt as element B', the temperature of the thin stream of molten liquid is preferably greater than 1580° C., preferably greater than 1590° C. and less than 1650° C., preferably less than 1630° C. When the starting charge is adjusted so as to obtain an LMO product comprising aluminum as element B', the temperature of the thin stream of molten liquid is preferably greater than 1580° C. and less than 1630° C., preferably less than 1620° C.

The dispersing can result from blowing through the thin stream of the liquid mass. However, any other process for the spray drying of a liquid mass known to a person skilled in the art can be envisaged.

In stage $c_2$), the liquid droplets are transformed into solid particles by contact with an oxygen-comprising fluid, preferably a gaseous oxygen-comprising fluid, more preferably with air and/or water vapor. The oxygen-comprising fluid preferably comprises at least 20% by volume of oxygen.

Preferably, the process is adjusted so that, as soon as it is formed, the droplet of molten liquid is in contact with the oxygen-comprising fluid. More preferably, the dispersing (stage $c_1$)) and the solidifying (stage $c_2$)) are substantially simultaneous, the liquid mass being dispersed by an oxygen-comprising fluid, preferably a gaseous oxygen-comprising fluid, capable of cooling and solidifying this liquid.

Preferably, the contact with the oxygen-comprising fluid is maintained at least until the particles have completely solidified.

Blowing of air at ambient temperature is possible.

On conclusion of stage $c_2$), solid particles are obtained which exhibit a size of between 0.01 µm and 3 mm, indeed even between 0.01 µm and 5 mm, as a function of the dispersing conditions.

In a second embodiment, stage c) consists of the stages $c_1$'), $c_2$') and $c_3$') described above.

In stage $c_1$'), the liquid mass is poured into a mold capable of withstanding the molten liquid bath. Use will preferably be made of molds made of graphite, made of cast iron, or as defined in U.S. Pat. No. 3,993,119. In the case of an induction furnace, the winding is regarded as constituting a mold. The pouring is preferably carried out under air.

In stage $c_2$'), the liquid mass poured into the mold is cooled until an at least partially solidified block is obtained.

Preferably, during the solidification, the liquid mass is brought into contact with an oxygen-comprising fluid, preferably a gaseous oxygen-comprising fluid, preferably with air. This contacting operation can be carried out from the moment of the pouring. However, it is preferable to begin this contacting operation only after the pouring. For practical reasons, the operation of bringing into contact with the oxygen-comprising fluid preferably begins only after the removal from the mold, preferably as soon as possible after the removal from the mold.

The oxygen-comprising fluid preferably comprises at least 20% by volume of oxygen.

Preferably, the contact with the oxygen-comprising fluid is maintained until the block has completely solidified.

In stage $c_3$'), the block is removed from the mold. In order to facilitate the operation in which the liquid mass is brought into contact with an oxygen-comprising fluid, it is preferable to remove the block from the mold as rapidly as possible, if possible before complete solidification. Solidification is thus continued during stage $c_3$').

Preferably, the block is removed from the mold as soon as it exhibits sufficient stiffness to substantially retain its shape. Preferably, the block is removed from the mold as rapidly as possible and the operation of bringing into contact with the oxygen-comprising fluid is then immediately begun.

Preferably, the removal from the mold is carried out less than 20 minutes after the beginning of solidification.

After complete solidification, a block is obtained which is capable of giving, after stages d) and optionally e), a powder formed of particles according to the invention.

In stage d), the fused product obtained is crushed and/or ground, so as to reduce the site of the pieces to be heat treated during the following stage e). The powder formed of fused particles obtained at the end of stage d) preferably exhibits a $D_{99.5}$ maximum size of less than 110 µm, preferably of less than 100 µm, preferably of less than 80 µm, preferably of less than 53 µm, preferably of less than 30 µm, preferably of less than 10 µm.

All types of crushers and mills can be used to reduce the size of the pieces to be heat treated. Preferably, an air jet mill or a ball mill will be used.

In stage e), the pieces obtained at the end of stage c) and/or at the end of stage d) are preferably introduced into a furnace in order to be subjected to an annealing heat treatment. Advantageously, such an annealing makes it possible to increase the LMO content. It is thus possible to obtain LMO levels substantially equal to 100%, impurities excluded.

Preferably, the product intended to be heat treated is provided in the form of a powder exhibiting a $D_{99.5}$ maximum size of less than 110 µm, preferably of less than 100 µm, preferably of less than 80 µm, preferably of less than 53 µm, preferably of less than 30 µm, preferably of less than 10 µm. The effectiveness of the annealing heat treatment is advantageously improved thereby.

The stationary temperature level of the annealing treatment is preferably greater than 550° C., preferably greater than 600° C., preferably greater than 650° C., preferably greater than 700° C. and/or preferably less than 1200° C., preferably less than 1100° C., preferably less than 1000° C., preferably less than 900° C. This temperature is preferably maintained for a period of time of greater than 2 hours and/or of less than 24 hours, preferably of less than 15 hours, preferably of less than 10 hours. An annealing treatment at a stationary temperature level of 800° C., maintained for 4 hours, is highly suitable. Preferably, the annealing heat treatment is carried out under an atmosphere comprising at least 20% by volume of oxygen, preferably under air, preferably at the ambient pressure of approximately 1 bar.

The fused particles can be ground after annealing. If necessary, a particle size selection is subsequently carried out, as a function of the application targeted.

The fused LMO particles can be subjected to a granulation or spray drying stage which facilitates the use thereof.

The fused LMO particles and/or the aggregates of said particles and/or the agglomerates of said particles can also be coated at the surface, at least partially, indeed even completely, so as in particular to limit the dissolution of the manganese, in particular when they are used in a cathode for lithium-ion batteries. In an "aggregate", the association between the particles is stronger than in the case of an association in the form of agglomerates. For example, the particles can be chemically bonded to one another. The splitting of the agglomerates into smaller agglomerates or into particles is thus easier than the splitting of the aggregates into smaller aggregates or into particles.

The coating materials used to coat the LMO particles and/or the aggregates of said particles and/or the agglomerates of said particles can in particular be chosen from the group formed of $SiO_2$, MgO, ZnO, $CeO_2$, $ZrO_2$, $Al_2O_3$, $Co_3O_4$—$Al_2O_3$ solid solutions, and oxides comprising lithium, in particular optionally doped lithium phosphates, such as $LiFePO_4$, optionally doped mixed oxides, such as $LiCoO_2$, or $LiNi_{0.8}Co_{0.2}O_2$, optionally doped lithium titanates, such as $Li_4Ti_5O_{12}$, and LMOs, such as $LiNi_{0.05}Mn_{1.95}O_4$. Preferably, said coating material is chosen from the group formed of $ZrO_2$, $Al_2O_3$, $Co_3O_4$—$Al_2O_3$ solid solutions, and oxides comprising lithium.

The coating layer can exhibit a thickness of greater than 1 µm, indeed even of greater than 2 µm, indeed even of greater than 3 µm and/or of less than 10 µm, indeed even of less than 6 µm.

The LMO particles can be coated according to techniques known to a person skilled in the art, for example by precipitation, by impregnation and evaporation, or also by the sol-gel technique.

In one embodiment, an aggregate or an agglomerate of fused LMO particles exhibits, between said LMO particles, from its core towards its surface, a concentration gradient of a compound chosen in particular from the group consisting of $SiO_2$, $MgO$, $ZnO$, $CeO_2$, $ZrO_2$, $Al_2O_3$, solid $Co_3O_4$—$Al_2O_3$ solutions, and oxides comprising lithium, in particular optionally doped lithium phosphates, such as $LiFePO_4$, optionally doped mixed oxides, such as $LiCoO_2$, or $LiNi_{0.8}Co_{0.2}O_2$, optionally doped lithium titanates, such as $Li_4Ti_5O_{12}$, and LMOs, such as $LiNi_{0.05}Mn_{1.95}O_4$.

Such agglomerates and aggregates, generally referred to as of "core-shell" type, can be obtained by spray drying particles of fused LMO and a solvent comprising said compound or a precursor of said compound in solution and/or in suspension.

The particles of fused product according to the invention can advantageously exhibit varied dimensions, the manufacturing process not being limited to the production of submicronic LMO powders. It is thus perfectly suited to industrial manufacture.

In addition, the particles obtained can advantageously be used to manufacture a cathode for lithium-ion batteries.

Remarkably, the LMO products according to the invention behave differently from the LMO products manufactured by prior techniques, in particular as regards the change in the unit cell parameter of the face-centered cubic crystal structure of said product as a function of the ratio $(1+x)/(2-y)$, in particular when said ratio is between 0.45 and 0.6. The unit cell parameter of a face-centered cubic crystal structure is equal to the length of the edge of the cube.

The unit cell parameter can be determined by X-ray diffraction on powders having a maximum size of less than 40 µm by the Rietveld refinement technique with the High Score Plus software from PANalytical. The acquisitions can be carried out with the)(Pert Pro equipment (copper anticathode Xcelerator detector) from 10° to 125° in 2θ, a step of 0.017° and 100 seconds/step.

Examples

The following examples are provided for illustrative purposes and do not limit the invention. The fused products were manufactured in the following way.

The following starting materials were first intimately mixed in a mixer:
lithium carbonate $Li_2CO_3$ powder, the purity of which is greater than 99% by weight and the median size of which is less than 420 µm;
$MnO_2$ powder, the purity of which is greater than 91% by weight and the median size of which is approximately 45 µm;
for examples 6 and 7, a $Co_3O_4$ powder, the purity of which is greater than 99% by weight and the median size of which is between 5 and 7 µm;
for example 8, an alumina $Al_2O_3$ powder, the purity of which is greater than 99.7% by weight and the median size of which is approximately 60 µm.

For examples 1 to 7, with each of the starting charges obtained, the latter with a weight of 4 kg, was tipped into an arc melting furnace of Héroult type. It was subsequently melted according to melting with a voltage of 40 volts, a power of 16 kW and an applied energy substantially equal to 1400 kWh/T, in order to completely and homogeneously melt the entire mixture.

For the product according to example 1, when the melting was complete, the molten liquid was poured under air into molds made of cast iron, as defined in U.S. Pat. No. 3,993,119, and such that the thickness of the poured component was equal to 5 mm. The temperature of the molten liquid measured during the pouring was 1495° C.

For the products according to examples 2 to 7, when the melting was complete, the molten liquid was poured so as to form a thin stream. The temperature of the molten liquid measured during the pouring was between 1490° C. and 1550° C. for the meltings of examples 2 to 5 and between 1598° C. and 1630° C. for the meltings of examples 6 and 7.

Blowing dry compressed air, at ambient temperature and at a pressure of 8 bar, breaks up the thin stream and disperses the molten liquid into droplets.

The blowing cools these droplets and congeals them in the form of fused particles. According to the blowing conditions, the fused particles may or may not be spherical and may be hollow or solid. They exhibit a size of between 0.005 mm and 5 mm.

For example 8, the starting charge, with a weight of 75 grams, was tipped into an alumina crucible. The crucible was placed in a Nabertherm HT 16/17 electric furnace and was then heated, in the open air, at 1540° C. for 1 hour, the rate of temperature rise being 300° C./h and the rate of temperature fall being 300° C./h. After cooling, a fused product is recovered in the crucible.

The fused product of example 1 was subsequently broken using a hammer, so as to obtain a piece exhibiting the dimensions of 10×10×4.8 mm³.

The fused particles of example 2 were subsequently ground in an RS100 vibratory disc mill sold by Retsch and then sieved, so as to recover the undersize from the sieve with an opening of 106 µm.

The fused particles from example 3 were subsequently sieved, so as to recover the undersize from the sieve with an opening of 106 µm, the 250 µm-500 µm intersieve fraction and the 2 mm-5 mm intersieve fraction.

The fused particles from example 5 were subsequently ground in an RS100 vibratory disc mill sold by Retsch and then sieved, so as to recover the undersize from the sieve with an opening of 53 µm.

The fused particles of examples 4, 6 and 7 were subsequently sieved, so as to recover the undersize from the sieve with an opening of 53 µm.

The fused products from examples 1 to 7 were heat treated in an electric furnace in the following way: for each example, between 5 and 20 grams of product are placed in a Nabertherm HT 16/17 electric furnace, in an alumina crucible. The furnace is subsequently brought to a temperature T with a rate of rise of 300° C./h. The maintenance time at the temperature T is equal to t. The rate of fall is 300° C./h. The heat treatment was carried out under an air atmosphere, at atmospheric pressure.

The chemical analysis and the analysis for determining the optionally doped lithium-manganese spinel phase were carried out on samples which exhibited, after grinding, a median size of less than 40 μm.

The chemical analysis was carried out by X-ray fluorescence and by inductively coupled plasma or lop for the lithium oxide and the manganese oxide.

The LMO content was determined from the X-ray diffraction diagrams, acquired with a D5000 diffractometer from Bruker provided with a copper X-ray diffraction tube.

With the use of EVA software (sold by Bruker) and after having carried out a subtraction of the continuous background (background 0.8), it is possible to measure the area $A_{LMO}$ (without deconvolution treatment) of the main diffraction peak or main diffraction multiplet of the LMO and, for each of the secondary phases, the area $A_{sp}$ (without deconvolution treatment) of the nonsuperimposed peak of greatest intensity or of the nonsuperimposed multiplet of greatest intensity. The total area $A_{secondary\ phases}$ can then be calculated by the sum of the $A_{sp}$ areas. The LMO content is then calculated according to the formula (1).

Thus, if the LMO phase is the only phase present in the X-ray diffraction diagram, the LMO content is equal to 100%.

Thus, the product from example 7, after having been subjected to an annealing heat treatment at 800° C. for 4 hours, exhibits an X-ray diffraction diagram revealing a main $LiMn_2O_4$ peak in the 2Θ angular range between 17.5° and 19.5° and a peak of greatest intensity for the $MnO_2$ secondary phase in the 2Θ angular range between 20.5° and 21.6°. the LMO content is equal to 99.5%.

The results obtained are summarized in tables 1 and 2:

TABLE 1

| Example | Chemical analysis obtained (%) | | | | | | | | | | Content of optionally doped lithium-manganese spinel, impurities excluded (%) |
|---|---|---|---|---|---|---|---|---|---|---|---|
| | $Li_2O$ | MnO | CoO | $Na_2O$ | $Al_2O_3$ | $SiO_2$ | CaO | $Fe_2O_3$ | $ZrO_2$ | Others | |
| 1 | 10 | 89.3 | — | 0.23 | <0.05 | <0.05 | 0.05 | 0.27 | <0.05 | 0.15 | 0 |
| 2 | 9.5 | 89.1 | — | 0.35 | 0.3 | 0.1 | 0.2 | 0.1 | 0.17 | 0.18 | 0 |
| 3 | 9.2 | 90.1 | — | 0.29 | 0.1 | <0.05 | 0.1 | 0.1 | <0.10 | 0.11 | 0 |
| 4 | 11.3 | 87.6 | — | 0.23 | — | <0.1 | 0.2 | 0.2 | 0.2 | 0.17 | 0 |
| 5 | 9.9 | 89.3 | — | 0.20 | <0.05 | 0.1 | 0.1 | <0.1 | 0.1 | 0.15 | 0 |
| 6 | 10.7 | 84 | 4.6 | 0.2 | — | 0.15 | 0.1 | — | 0.1 | 0.15 | 0 |
| 7 | 7.8 | 81.5 | 10.1 | 0.16 | — | 0.1 | 0.08 | — | — | 0.16 | 0 |
| 8 | 10.24 | 78.95 | — | 0.2 | 10.02 | 0.15 | 0.1 | 0.1 | <0.1 | 0.14 | 9 |

TABLE 2

| Heat-treated product | Form of the heat-treated product | Parameters of the annealing heat treatment | | Chemical analysis obtained after heat treatment $Li_{(1+x)}Mn_2O_4$ | | Chemical analysis obtained after heat treatment $Li_{(1+x)}Mn_{(2-y)}Co_yO_4$ | | Content of optionally doped lithium-manganese spinel after annealing heat treatment (%) |
|---|---|---|---|---|---|---|---|---|
| | | Stationary temperature level T (° C.) | Stationary level time t (h) | x | y | x | y | |
| Product of example 1 | Pieces 10 × 10 × 4.8 mm³ | 1200 | 2 | 0.06 | 0 | — | — | 2.8 |
| Product of example 2 | Powder exhibiting $D_{99.5}$ < 106 μm | 800 | 4 | 0.03 | 0 | — | — | 95.8 |
| Product of example 3 | Powder exhibiting $D_{99.5}$ < 106 μm | 1200 | 2 | −0.02 | 0 | — | — | 94.3 |
| Product of example 3 | Particles having a size of between 250 μm and 500 μm | 1200 | 2 | −0.02 | 0 | — | — | 84.1 |
| Product of example 3 | Particles having a size of between 2 mm and 5 mm | 1200 | 2 | −0.02 | 0 | — | — | 24.6 |
| Product of example 4 | Powder exhibiting a $D_{99.5}$ < 53 μm | 800 | 4 | 0.23 | 0 | — | — | 99.4 |
| Product of example 5 | Powder exhibiting a $D_{99.5}$ < 53 μm | 800 | 4 | 0.07 | 0 | — | — | 100 |
| Product of example 6 | Powder exhibiting a $D_{99.5}$ < 53 μm | 800 | 4 | — | — | 0.15 | 0.1 | 93.9 |
| Product of example 7 | Powder exhibiting a $D_{99.5}$ < 53 μm | 800 | 4 | — | — | −0.18 | 0.21 | 99.5 |

These examples make it possible to demonstrate the effectiveness of the process according to the invention.

A comparison of the results of the annealing treatments of the product of example 3 also shows that the heat treatment increases in effectiveness as the dimensions of the products treated become smaller.

As is now clearly apparent, the process according to the invention makes it possible to manufacture, in a simple and economic way, in industrial amounts, products comprising large amounts of fused lithium-manganese spinel $Li_{(1+x)}Mn_{(2-y)}B'_yO_4$ with $-0.20 \leq x \leq 0.4$ and $0 \leq y \leq -1$, the element B' being chosen from aluminum, cobalt, nickel, chromium, iron, magnesium, titanium, vanadium, copper, zinc, gallium, calcium, niobium, yttrium, barium, silicon, boron, zirconium and their mixtures.

In particular, this process makes it possible to manufacture particles for which the content of lithium-manganese spinel $Li_{(1+x)}Mn_2O_4$ with $-0.20 \leq x \leq 0.4$, impurities excluded, is greater than 99%, greater than 99.9%, indeed even equal to 100%. This process makes possible the manufacture of products comprising lithium-manganese spinel for which:

the content by weight of "lithium expressed in the $Li_2O$ form" is greater than 7.60%, preferably greater than 8.04%, preferably greater than 8.47%, preferably greater than 9.32% and/or less than 12.82%, preferably less than 12.26%, preferably less than 11.20%, indeed even less than 10.36%, and/or the content by weight of "manganese expressed in the MnO form" is greater than 85.43%, preferably greater than 85.98%, preferably greater than 87.03%, indeed even greater than 87.95% and/or less than 92.25%, preferably less than 91.80%, preferably less than 91.36%, preferably less than 90.49%, and/or the content by weight of impurities is less than 2%, preferably less than 1%, preferably less than 0.7%, preferably less than 0.4%, preferably less than 0.1%.

In the case where the element B' is aluminum, this process makes possible in particular the manufacture of products comprising aluminum-doped lithium-manganese spinel for which:

the content by weight of "lithium expressed in the $Li_2O$ form" is greater than 8.73%, preferably greater than 9.69%, preferably greater than 10.67% and/or less than 13.31%, and/or the content by weight of "aluminum expressed in the $Al_2O_3$ form" is greater than 9.57% and/or less than 38.11%, preferably less than 29.61%, preferably less than 21.58%, preferably less than 14.00%, indeed even less than 10.36%, and/or the content by weight of "manganese expressed in the MnO form" is greater than 48.67%, preferably greater than 51.92%, preferably greater than 60.51%, preferably greater than 68.61%, preferably greater than 75.38%, indeed even greater than 76.27% and/or less than 81.58%, and/or the content by weight of impurities is less than 2%, preferably less than 1%, preferably less than 0.7%, preferably less than 0.4%, preferably less than 0.1%.

In the case where the element B' is cobalt, this process makes possible in particular the manufacture of products comprising cobalt-doped lithium-manganese spinel for which:

the content by weight of "lithium expressed in the $Li_2O$ form" is greater than 7.41%, preferably greater than 9.09%, preferably greater than 9.25% and/or less than 12.73%, and/or the content by weight of "cobalt expressed in the CoO form" is greater than 13.44% and/or less than 47.49%, preferably less than 38.19%, preferably less than 28.79%, preferably less than 19.29%, indeed even less than 14.50%, and/or the content by weight of "manganese expressed in the MnO form" is greater than 41.69%, preferably greater than 44.05%, preferably greater than 53.13%, preferably greater than 62.31%, preferably greater than 71.58%, indeed even greater than 72.09% and/or less than 77.80%, and/or the content by weight of impurities is less than 2%, preferably less than 1%, preferably less than 0.7%, preferably less than 0.4%, preferably less than 0.1%.

In the case where the element B' is nickel, this process makes possible in particular the manufacture of products comprising nickel-doped lithium-manganese spinel for which:

the content by weight of "lithium expressed in the $Li_2O$ form" is greater than 7.42%, preferably greater than 9.10%, preferably greater than 9.25% and/or less than 12.74%, and/or the content by weight of "nickel expressed in the NiO form" is greater than 13.41% and/or less than 47.42%, preferably less than 38.12%, preferably less than 28.73%, preferably less than 19.25%, indeed even less than 14.47%, and/or the content by weight of "manganese expressed in the MnO form" is greater than 41.74%, preferably greater than 44.11%, preferably greater than 53.19%, preferably greater than 62.36%, preferably greater than 71.61%, indeed even greater than 72.11% and/or less than 77.83%, and/or the content by weight of impurities is less than 2%, preferably less than 1%, preferably less than 0.7%, preferably less than 0.4%, preferably less than 0.1%.

In the case where the element B' is chromium, this process makes possible in particular the manufacture of products comprising chromium-doped lithium-manganese spinel for which:

the content by weight of "lithium expressed in the $Li_2O$ form" is greater than 7.36%, preferably greater than 9.02%, preferably greater than 9.23% and/or less than 12.70%, and/or the content by weight of "chromium expressed in the $Cr_2O_3$ form" is greater than 13.61% and/or less than 47.85%, preferably less than 38.53%, preferably less than 29.09%, preferably less than 19.52%, indeed even less than 14.69%, and/or the content by weight of "manganese expressed in the MnO form" is greater than 41.42%, preferably greater than 43.75%, preferably greater than 52.84%, preferably greater than 62.05%, preferably greater than 71.37%, indeed even greater than 77.94% and/or less than 77.64%, and/or the content by weight of impurities is less than 2%, preferably less than 1%, preferably less than 0.7%, preferably less than 0.4%, preferably less than 0.1%.

In the case where the element B' is iron, this process makes possible in particular the manufacture of products comprising iron-doped lithium-manganese spinel for which:

the content by weight of "lithium expressed in the $Li_2O$ form" is greater than 7.18%, preferably greater than 8.82%, preferably greater than 9.16% and/or less than 12.62%, and/or the content by weight of "iron expressed in the $Fe_2O_3$ form" is greater than 14.19% and/or less than 49.07%, preferably less than 39.69%, preferably less than 30.10%, preferably less than 20.30%, indeed even less than 15.31%, and/or the content by weight of "manganese expressed in the MnO form" is greater than 40.50%, preferably greater than 42.73%, preferably greater than 51.84%, preferably greater than 61.16%, preferably greater than 70.68%, indeed even greater than 71.44% and/or less than 77.07%, and/or the content by weight of impurities is less than 2%, preferably less than 1%, preferably less than 0.7%, preferably less than 0.4%, preferably less than 0.1%.

The dimensions of these products can subsequently be reduced, for example by grinding in the form of powders, if their use requires it. These products can also be obtained directly in the form of particles.

Of course, the present invention is not limited to the embodiments described, provided by way of illustrative and nonlimiting examples.

In particular, the products according to the invention are not limited to specific forms or dimensions.

The invention claimed is:

1. A fused product obtained by solidification by cooling of a molten material melted at a temperature greater than 1450° C., said fused product comprising lithium-manganese spinel, which is optionally doped, having a spinel structure $AB_2O_4$, where the site A is occupied by lithium and the site B is occupied by manganese, the site B being optionally doped with an element B' and the site A exhibiting optionally a substoichiometry or a superstoichiometry with respect to the site B, so that the product observes the formula $Li_{(1+x)}Mn_{(2-y)}B'_yO_4$, with $-0.20 \leq x \leq 0.4$ and $0 \leq y \leq 1$, the element B' being selected from the group consisting of aluminum, cobalt, nickel, chromium, iron, magnesium, titanium, vanadium, copper, zinc, gallium, calcium, niobium, yttrium, barium, silicon, boron, zirconium and mixtures thereof, the said fused product comprising a content of optionally doped lithium-manganese spinel of greater than 50%, impurities excluded, the optionally doped lithium-manganese spinel, named LMO, content, impurities excluded, in %, being defined as $$100*(A_{LMO})/(A_{LMO}+A_{Secondary\ phases}),$$

where $A_{LMO}$ is the sum of areas of LMO phases, measured on an X-ray diffraction diagram of the product, without deconvolution treatment, an area of a LMO phase being that of its main diffraction peak or of its main diffraction multiplet;

$A_{Secondary\ phases}$ is the sum of areas of secondary phases, measured on the same diagram, without deconvolution treatment, an area of a secondary phase being that of its nonsuperimposed diffraction peak of greatest intensity or of its nonsuperimposed diffraction multiplet of greatest intensity, a nonsuperimposed diffraction peak being a diffraction peak corresponding to a single phase and a nonsuperimposed diffraction multiplet being a diffraction multiplet corresponding to a single phase.

2. The fused product as claimed in the claim 1, in which the element B' is selected from the group consisting of aluminum, cobalt, nickel, chromium, iron, magnesium, titanium, vanadium, copper, zinc, gallium and mixtures thereof.

3. The fused product as claimed in claim 1, in which the element B' is selected from the group consisting of aluminum, cobalt, nickel, chromium, iron and mixtures thereof.

4. The fused product as claimed in claim 1, in which $x \geq -0.15$ and/or $x \leq 0.33$.

5. The fused product as claimed in claim 4, in which $x \geq -0.1$ and/or $x \leq 0.2$.

6. The fused product as claimed in claim 5, in which $x \geq 0$.

7. The fused product as claimed in claim 1, in which $y \leq 0.8$.

8. The fused product as claimed in claim 7, in which $y \leq 0.6$.

9. The fused product as claimed in claim 8, in which $y \leq 0.4$.

10. The fused product as claimed in claim 9, in which $y \leq 0.2$.

11. The fused product as claimed in claim 1, in which the content of optionally doped lithium-manganese spinel, impurities excluded, is greater than 70%.

12. The fused product as claimed in claim 11, in which the content of optionally doped lithium-manganese spinel, impurities excluded, is greater than 90%.

13. The fused product as claimed in claim 12, in which the content of optionally doped lithium-manganese spinel, impurities excluded, is greater than 99%.

14. The fused product as claimed in claim 13, in which the content of optionally doped lithium-manganese spinel, impurities excluded, is greater than 99.9%.

15. The fused product as claimed in claim 1, exhibiting the following chemical composition, as percentages by weight and for a total of 100%:
7.60%<lithium expressed in $Li_2O$ form<12.82%,
85.43%<manganese expressed in MnO form<92.25%,
impurities<2%.

16. The fused product as claimed in claim 1, exhibiting the following chemical composition, as percentages by weight and for a total of 100%:
8.73%<lithium expressed in $Li_2O$ form<13.31%,
48.67%<manganese expressed in MnO form<81.58%,
9.57%<aluminum expressed in $Al_2O_3$ form<38.11%,
impurities<2%.

17. The fused product as claimed in claim 1, exhibiting the following chemical composition, as percentages by weight and for a total of 100%:
7.41%<lithium expressed in $Li_2O$ form<12.73%,
41.69%<manganese expressed in MnO form<77.80%,
13.44%<cobalt expressed in CoO form<47.49%,
impurities<2%.

18. The fused product as claimed in claim 1, exhibiting the following chemical composition, as percentages by weight and for a total of 100%:
7.42%<lithium expressed in $Li_2O$ form<12.74%,
41.74%<manganese expressed in MnO form<77.83%,
13.41%<nickel expressed in NiO form<47.42%,
impurities<2%.

19. The fused product as claimed in claim 1, exhibiting the following chemical composition, as percentages by weight and for a total of 100%:
7.36%<lithium expressed in $Li_2O$ form<12.70%,
41.42%<manganese expressed in MnO form<77.64%,
13.61%<chrome expressed in $Cr_2O_3$ form<47.85%,
impurities<2%.

20. The fused product as claimed in claim 1, exhibiting the following chemical composition, as percentages by weight and for a total of 100%:
7.18%<lithium expressed in $Li_2O$ form<12.62%,
40.50%<manganese expressed in MnO form<77.07%,
14.19%<iron expressed in $Fe_2O_3$ form<49.07%,
impurities<2%.

21. A powder formed of particles made of a fused product as claimed in claim 1, exhibiting a median size of greater than 0.4 μm and of less than 4 mm.

22. The powder as claimed in claim 21, exhibiting a median size of between 0.5 µm and 5 µm.

23. The powder as claimed in claim 21, exhibiting a median size of between 5 µm and 15 µm.

24. The powder as claimed in claim 21, exhibiting a median size of between 15 µm and 35 µm.

25. A manufacturing process, comprising the following stages:
   a) mixing starting materials, so as to form a starting charge suitable for obtaining, on conclusion of stage c), a product as claimed in claim 1,
   b) melting the starting charge at a temperature greater than 1450° C. until a liquid mass is obtained,
   c) cooling said liquid mass until it has completely solidified, so as to obtain a fused product,
   d) optionally, grinding said fused product,
   e) optionally, heat treating the fused product at a stationary temperature level of between 500° C. and 1540° C. and for a maintenance time at the stationary level of greater than 30 minutes.

26. The process as claimed in claim 25, comprising said stage e).

27. The process as claimed in claim 26, in which the fused product is provided in the form of powder exhibiting a maximum size of less than 53 µm.

28. The process as claimed in claim 25, in which, in stage e), the heat treatment is carried out at a stationary temperature level of between 700° C. and 900° C. for a stationary temperature level time of between 2 hours and 10 hours.

29. The process as claimed in claim 28, in which the heat treatment is carried out under an atmosphere comprising at least 20% by volume of oxygen.

30. The process as claimed in claim 25, in which stage c) comprises the following stages:
   c1) dispersing the liquid mass in the form of liquid droplets,
   c2) solidifying these liquid droplets by contact with an oxygen-comprising fluid, to obtain the fused product in the form of particles,
   or the following stages:
   c1') pouring the liquid mass into a mold;
   c2') solidifying, by cooling, the liquid mass poured into the mold until an at a completely solidified block is obtained;
   c3') removing the block from the mold,
   or the following stages:
   c1") pouring the liquid mass into a mold;
   c2") solidifying, by cooling, the liquid mass poured into the mold until a partially solidified block is obtained;
   c3") removing the partially solidified block from the mold and solidifying completely, by cooling, the removed partially solidified block.

31. The process as claimed in claim 30, in which, in stage c1) and/or in stage c2) and/or in stage c1') and/or in stage c2') and/or in stage c1") and/or in stage c2") and/or in stage c3"), said liquid mass is brought into contact with an oxygen-comprising fluid.

32. The process as claimed in claim 31, in which said contact is maintained until step c2) is complete or until step c2') is complete or until step c3") is complete.

33. The process as claimed in claim 31, in which the stages of dispersion c1) and of solidification c2) are simultaneous.

34. The process as claimed in claim 25, in which the compounds contributing the elements lithium, B' and manganese together represent more than 90%, as percentages by weight, of the constituents of the starting charge.

35. The process as claimed in claim 34, the compounds contributing the elements lithium, B' and manganese together representing more than 99%, as percentages by weight, of the constituents of the starting charge.

36. The process as claimed in claim 35, the compounds contributing the elements lithium, B' and manganese representing, together with the impurities, 100% of the constituents of the starting charge.

37. The process as claimed in claim 25, wherein:
   the compounds contributing the element lithium are selected from the group consisting of $Li_2CO_3$ and $Li_2O$,
   the compounds contributing the element manganese are selected from the group consisting of $MnO_2$, $MnO$ and, $Mn_3O_4$, and
   the compounds contributing the element B' are selected from the group consisting of carbonates of the element B', hydroxides of the element B', and oxides of the element B'.

38. The process as claimed in claim 25, the molar contents Cli, Cb' and Cm of the elements lithium, B' and manganese, respectively, in the starting charge, as molar percentages on the basis of the sum of the contents Cli, Cb' and Cm, observing the following conditions:

$$k1 \cdot (1+x)/(2-y) \leq Cli/Cm \leq k2 \cdot (1+)/(2-y) \quad (2),$$

and/or $$k1 \cdot (1+x)/y \leq Cb'/Cm \leq k2 \cdot (1+x)/y \quad (3)$$

where $-0.20 \leq x \leq 0.4$ and $0 \leq y \leq 1$, k1 being equal to 0.8 and k2 being equal to 1.2.

39. The process as claimed in claim 25, the molar contents Cli, Cb' and Cm of the elements lithium, B' and manganese, respectively, in the starting charge, as molar percentages on the basis of the sum of the contents Cli, Cb' and Cm, observing the following conditions:

$$k1 \cdot (1+x)/(2-y) \leq Cli/Cm \leq k2 \cdot (1+x)/(2-y) \quad (2), \text{and/or}$$

$$k1 \cdot (1+x)/y \leq Cb'/Cm \leq k2 \cdot (1+x)/y \quad (3)$$

where $-0.20 \leq x \leq 0.4$ and $0 \leq y \leq 1$, k1 being equal to 0.9 and k2 being equal to 1.1.

40. A product obtained by a process comprising the following stages:
   a) mixing starting materials, so as to form a starting charge suitable for obtaining, on conclusion of stage c), a product as claimed in claim 1,
   b) melting the starting charge at a temperature greater than 1450° C. until a liquid mass is obtained,
   c) cooling said liquid mass until it has completely solidified, so as to obtain a fused product,
   d) optionally, grinding said fused product,
   e) optionally, heat treating the fused product at a stationary temperature level of between 500° C. and 1540° C. and for a maintenance time at the stationary level of greater than 30 minutes.

41. A cathode for lithium-ion batteries comprising a fused product as claimed in claim 1.

42. A battery comprising a cathode as claimed in claim 41.

* * * * *